Aug. 1, 1933.  L. CASPER  1,920,243

LOADING VEHICLE

Filed March 31, 1932    2 Sheets-Sheet 1

INVENTOR
Louis Casper

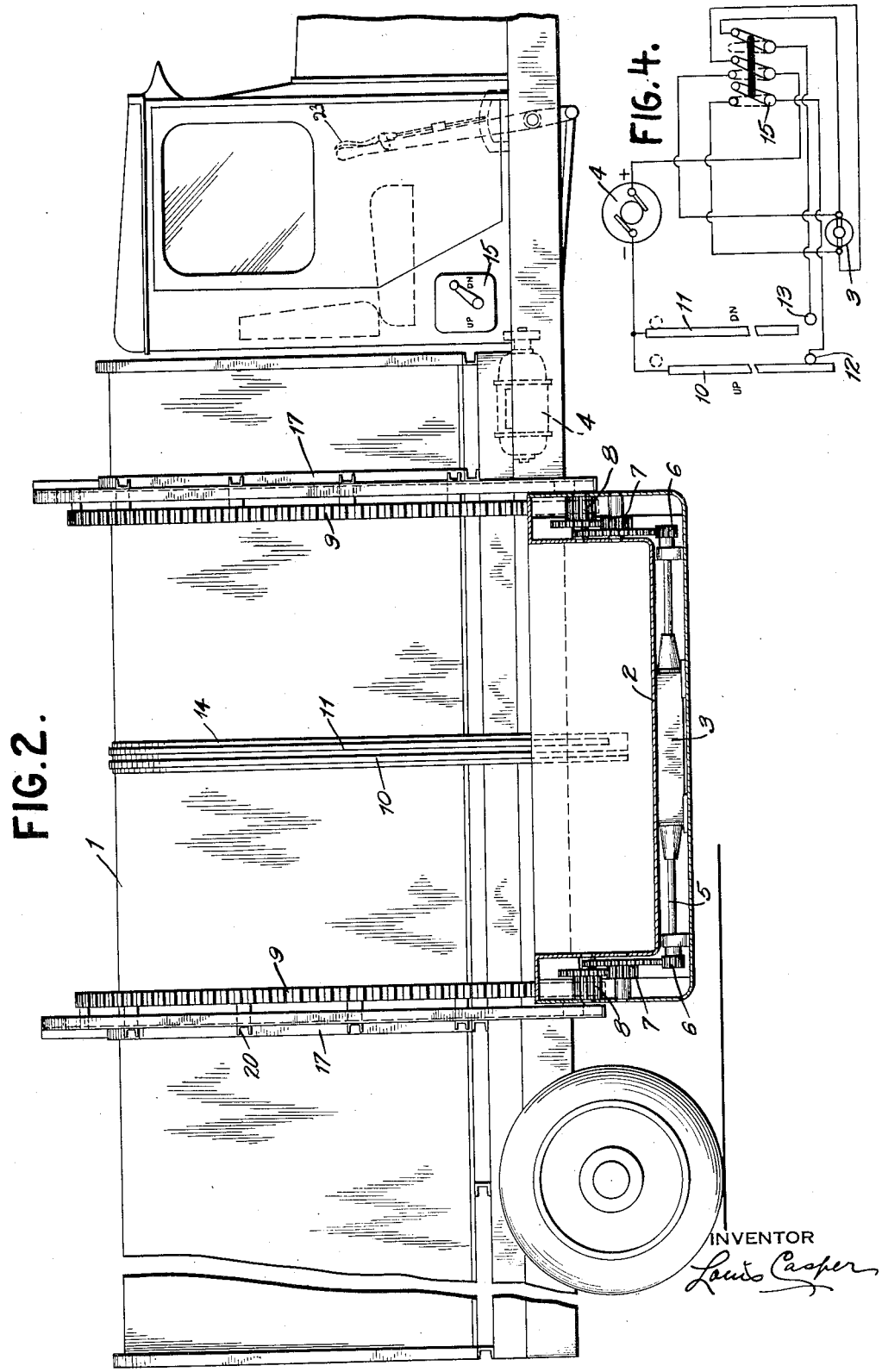

Patented Aug. 1, 1933

1,920,243

UNITED STATES PATENT OFFICE 1,920,243

LOADING VEHICLE

Louis Casper, Richmond Hill, N. Y.

Application March 31, 1932. Serial No. 602,192

9 Claims. (Cl. 214—67.)

My invention has reference to improvements in loading vehicles and is especially intended for garbage and ash collection which utilize motor trucks for such handling.

The main objects of my invention are to provide a means whereby the amount of labor and manual effort expended in the loading of ashes, garbage or the like into the body of a motor truck or other vehicle may be minimized and at the same time the loading aforesaid to be accomplished efficiently and expeditiously.

This is accomplished without employing complicated mechanism, sprockets, chains, cables or other similar equipment.

The foregoing and other objects of my invention will appear when it shall have been fully described.

In the following detailed description I shall refer to the accompanying drawings in which—

Fig. 2 is a side view of the motor truck showing the loading mechanism.

Figure 1:
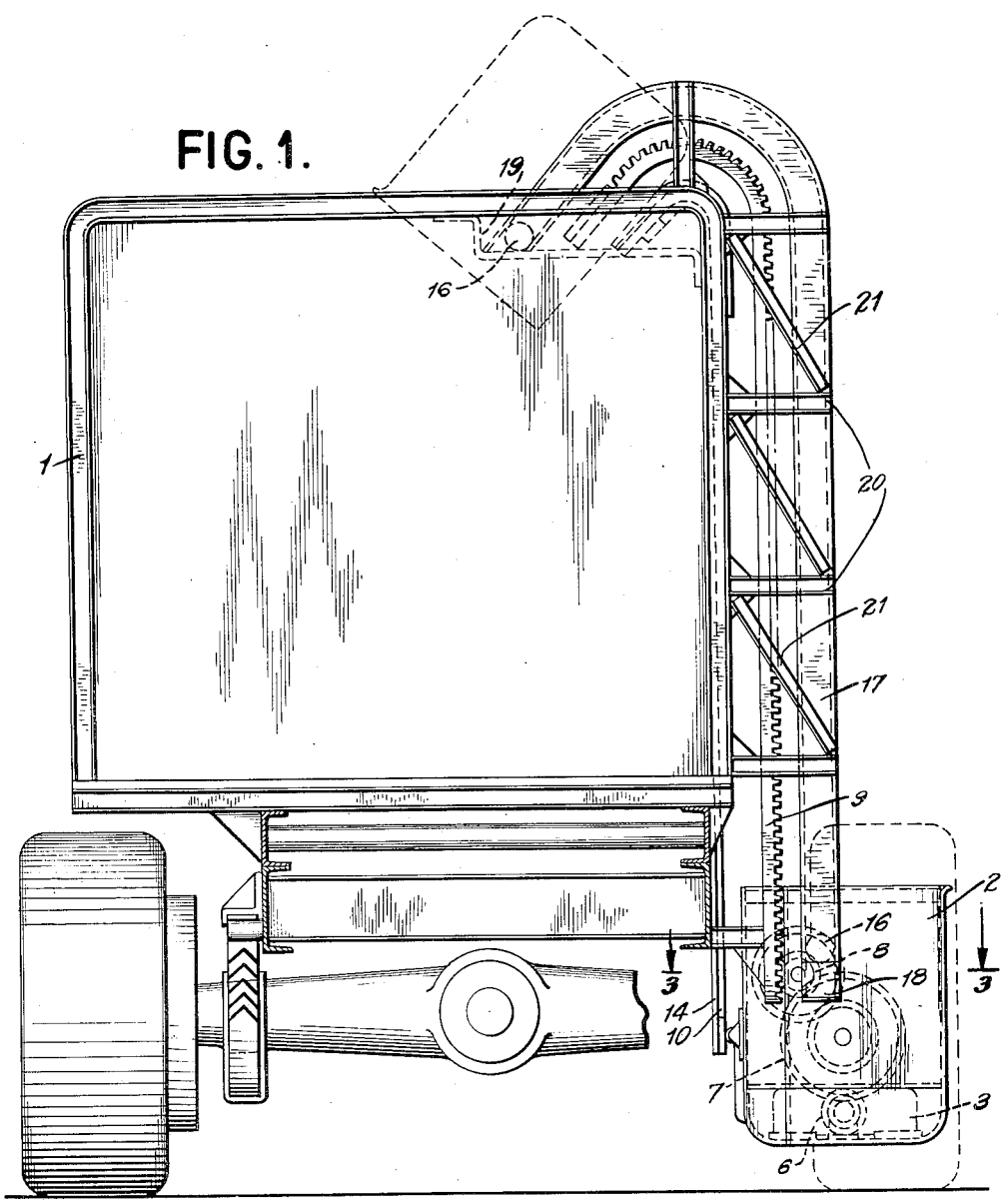
Fig. 1 is an end view of a motor truck with the loading arrangement mounted thereon.
Figure 3:
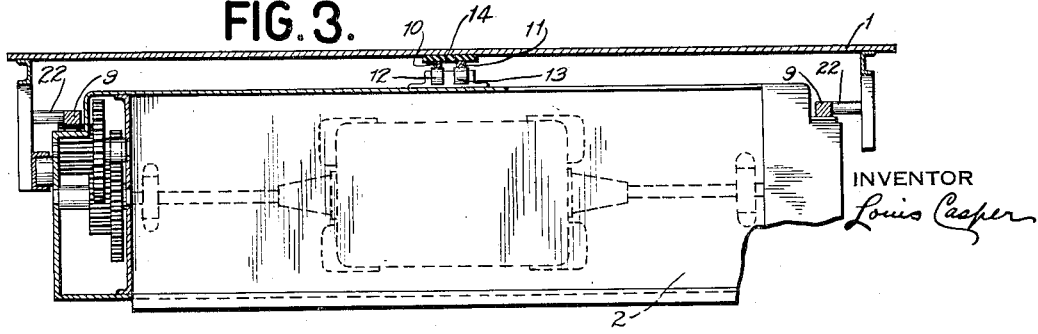
Fig. 3 is a top sectional detail of the dump hopper arrangement on a line 3—3 of Fig. 1.

Fig. 4 is a theoretical diagram showing the wiring arrangement including the generator 4, the motor 3, the contact tracks 10 and 11 with companion contact rollers 12, 13 and controlling switch 15.

Referring specifically to Fig. 1, 1 is the loading body of the truck. 2 is the dump hopper which is situated at the right side of the truck facing the front thereof. This position of the dump hopper with respect to the truck enables it to be on the sidewalk side when the truck shall have stopped on the right side of the street. An electric motor 3 is mounted in the hopper.

To provide the maximum cubical space in the dump hopper proper and still confine it to the space limit on the side of the truck as shown, it is necessary to minimize the space required for the electric motor. Therefore, by dividing the motor into two separate units, but employing one shaft, the circumference of the armature or rotor may be reduced in comparison with the size of the field coils or stator. Attached to the motor shaft 5 are driving gears 6 at each end thereof. The gears 6 coact with gears 7 at each end of the dump hopper, (see Fig. 2). The pinions of gears 7 coact with the gears 8 the pinion of which coact with two geared steel racks or tracks 9. The gears as described are normally housed in two gear boxes. The motor 3 is likewise normally housed.

Shown in dotted lines in Fig. 1 is a roller bearing 16 attached to the side wall or shell of the dump hopper 2. This roller bearing fits and functions in the guide groove of the supporting guide channel 17, the latter extending from the point just below the roller bearing 16 as seen in the Fig. 1 to the top of the loading body 1 and which curves over the latter until it strikes the heavy plate reinforcement 19.

The guide channel is supported by steel bars 20 secured into the body of the truck. The channel is further supported by reinforcements 21.

Mounted on the truck chassis is the electric generator 4. The generator may be either DC or AC types, the motor 3 of course having to be adapted to whatever kind of current generated. The generator is operably connected with the main shaft of the truck motor, normally used to propel the truck. No detail is shown of the operable connection of the generator with the truck motor as this is accomplished by standard methods of adjustably linking a gasoline or other type of prime mover in addition to the normal duty of said engine or prime mover in driving the motor truck.

By referring specifically to Fig. 4 it will be seen that the generator 4 is in an electric circuit with the control switch 15, the motor 3 and the two contact tracks 10 and 11 and their companion roller contactors 12 and 13. The contactors are in resilient contact with the contact track having similar flexibility to the trolley wheel contactor of an electric trolley car. One of these contactors can be seen in Fig. 1 contacting with the contact track 10. The contact tracks are insulated from the body of the truck by the insulated base strip 14. The steel rack and other metallic portions of the hopper make up the return circuit of the wiring arrangement shown in Fig. 4. A return circuit as stated, however, is not really essential, a trailer conductor from the generator or main switch 15 to the motor may be used.

The switch 15 is employed to start the hopper in motion by closing the circuit. If it is desired to elevate the dump hopper, the switch handle is turned to "up" and if the hopper should be at the top of the body of the truck the switch handle is turned to "down," in which event the current will flow in reverse direction to that of the "up" or elevated travel and the hopper will travel downward.

When the hopper shall have arrived at the top limit on to the plate 19 as shown in dotted line in Fig. 1, the motor 3 will automatically stop.

This is due to the fact that the "up" contact track is shorter than the "down" track, and when the hopper has arrived at the top limit of its travel, the contact track 10 being shorter than the contact track 11 is no longer in contact with the contactor roller 12, because as stated the track 10 has fallen short and as a consequence the circuit will be open and the motor stopped. When the switch handle is thrown to "down" the circuit will be closed because the "down" track is in contact with the contactor 13 and the hopper will start on its down travel. When the hopper shall have arrived at its "down" or normal position, the track 11 being shorter at its lower end, will fail to make contact with the contactor 13 thus opening the circuit and the motor 3 will as a consequence stop automatically. The hopper, however, can start on its "up" trip because the added length of the track 10 at its lower end permits contact with its companion contactor 12.

18 is a bumper made of rubber or other resilient material to soften the impact of the roller bearing 16 when the hopper has reached the limit of its downward travel. A similar bumper reinforcement of resilient material is likewise placed on the plate 19 to soften the impact when the hopper shall have arrived at its upper limit. 22 is a metallic reinforcement for the gear rack or track 9.

It is obvious that the hopper is readily adaptable as a holder for loaded ash or garbage cans or the like. In that event they may be properly secured to the body of the hopper. The contents of the cans or the like are dumped into the loading body of the truck when the hopper is elevated to its upper limit, after which the hopper may be returned to its normal or down position, bringing with it the empty can or cans that may be held by the hopper aforesaid.

The operation of the loading vehicle is as follows: The hopper 2 is filled with ashes, garbage, debris or the like by the attendants. The switch handle which is normally at the center of the switch 15, is turned to the "up" position. This closes the circuit in the "up" direction, and assuming the generator 4 is operating and generating electric current, the motor 3 is set in motion. This causes the driving gear combination consisting of gears 6—7 and 8 to coact, the pinion of the latter engaging with the rack or track 9. This causes the hopper to move vertically until it reaches the curved section of the rack 9 and the supporting guide channels when the hopper overturns and discharges its contents into the truck body. The hopper then automatically stops. The attendant then turns the handle of the switch 15 to the "down" position when the motor 3 starts in reverse direction and the hopper will travel downward in a manner similar to its upper travel reaching its normal or resting position when the motor 3 automatically stops and the operation as described is ready to be repeated.

When the body of the truck shall have become sufficiently loaded to require the discharge of its contents, it is generally tilted and such contents discharged at the rear end of the truck body.

When this occurs it is necessary for the truck body to be free from any loading equipment entanglements. This is possible by two methods: the first, the simplest method, is to lift the hopper to its upper limit, and by so doing places all the loading equipment on the truck body proper.

In some cases the foregoing method is considered objectionable and more preferable to tilt the truck body with the hopper in its down or normal position. In that case the hopper must be pushed back sufficiently to clear the pinion of gear 8 from the vertical geared rack or track 9. To do this the roller pin bearing must also be moved out of the grooves of the guide channels at each side of the hopper. This may be accomplished by the attendant pulling a lever situated in the cab of the motor truck similar to lever 23 in Fig. 2, which would release both the pinion and the roller pin simultaneously, the latter through a slot or opening at the lower end of the guide groove 17.

This latter feature is not claimed as a part of my invention, being given as a matter of information, therefore, the exact details of the arrangement as outlined have been omitted for the sake of simplicity and to better show the essential features pertaining to my invention.

It is obvious that various modifications are possible in my invention from that described in this specification without departing from the spirit thereof; for instance, the electric motor mounted in the hopper may be of standard design rather than the special two unit design motor shown in the drawings. Other methods may be employed to automatically stop the electric motor when it shall have reached its upper or lower limits.

Now having described my invention, what I claim is—

1. In a motive vehicle having a prime mover therein to propel the same; an electric generator mounted in said vehicle which is also operated by said prime mover; a loading body attached to and made a part of said vehicle; a movable hopper or the like in operable relation with said vehicle and adjacent to said loading body; electric motor means attached to said hopper and integral thereto, said electric motor means energized by the generator aforesaid to cause said hopper to raise and discharge the contents therein into said loading body and then to lower the hopper aforesaid to its initial starting position.

2. In a motive vehicle having a prime mover therein to propel the same; an electric generator mounted in said vehicle which is also operated by said prime mover; a loading body on said vehicle; a movable hopper or the like in operable relation to said vehicle; an electric motor contained in said hopper and energized by the generator aforesaid; driving means actuated by said motor; vertical traction means attached to the body of said vehicle coacting with said driving means causing said hopper to be elevated or lowered as set forth.

3. A loading vehicle propelled by a prime mover; an electric generator in operable relation to said prime mover; a movable hopper or the like in operable relation to said vehicle; electric motor means attached to said hopper; said motor means operably connected to and energized by said generator; driving means attached to said motor means that coact with vertical traction means which are mounted on said loading vehicle whereby said hopper may be elevated or lowered alongside the vehicle aforesaid and for the purpose set forth.

4. In a vehicle as described in claim 3; and electrical contacting means between the body of said vehicle and the hopper aforesaid whereby electric current may be continuously fed to said electric motor means from said power means while said hopper is being elevated or lowered.

5. In a vehicle as described in claim 3; and means for automatically stopping said electric motor when said hopper shall have arrived at its upper limit; and also means for automatically stopping said motor when said hopper shall have arrived at its lower limit.

6. In a vehicle as described in claim 3; and supporting means for said hopper mounted on the body of said vehicle whereby said hopper may remain in proper coacting relation with the vertical traction means aforesaid.

7. In a vehicle having a loading body; a hopper or the like relative thereto; an electric motor attached to said hopper; driving gear means attached to said motor operably coacting with vertical geared racks or tracks mounted on said body; electric power means energizing said electric motor whereby said hopper is elevated or lowered; and switching means controlling the movement of the hopper aforesaid.

8. In a motive vehicle having an engine for primarily propelling the same; an electric generator operably connected to said engine; a movable hopper or the like in operable relation to said vehicle; electric motor means attached to and made a part of said hopper, said motor means energized by the generator aforesaid; geared driving means attached to said motor means coacting with vertical geared traction tracks mounted on the body of said vehicle; and electric circuit controlling means for controlling the operation of the motor attached to the hopper aforesaid.

9. In a motive vehicle as described in claim 8; and channel guides for said hopper mounted on the body of said vehicle for the purpose set forth.

LOUIS CASPER.